United States Patent [19]
Schöpf

[11] 3,867,852
[45] Feb. 25, 1975

[54] FIXED OR ROTATABLE STRUCTURAL PART CONSISTING OF AN INNER AND OF AN OUTER PART

[75] Inventor: Hans-Joachim Schöpf, Stuttgart, Germany

[73] Assignee: Daimler-Benz Aktiengesellschaft, Stuttgart, Germany

[22] Filed: Nov. 23, 1973

[21] Appl. No.: 418,174

[30] Foreign Application Priority Data
Nov. 24, 1972 Germany.............................. 2257598

[52] U.S. Cl. ................................................. 74/446
[51] Int. Cl. ............................................ F16h 55/12
[58] Field of Search..................... 74/446, 439, 434; 29/159.2

[56] References Cited
UNITED STATES PATENTS
3,304,796   2/1967   Leege ............................... 74/439 X

*Primary Examiner*—Leonard H. Gerin
*Attorney, Agent, or Firm*—Craig & Antonelli

[57] ABSTRACT

A structural part such as a gear consisting of an inner portion forming a base body and preferably consisting of metal and of an outer portion forming a running surface and applied preferably according to well-known die-casting or injection-molding process, in which the contact surfaces of both portions that extend in the circumferential direction are undulatory; the base body is thereby at least as wide as the sprayed-on portion within the area of the latter while the undulations start at least from the end faces of the sprayed-on portion.

22 Claims, 3 Drawing Figures

3,867,852

FIXED OR ROTATABLE STRUCTURAL PART CONSISTING OF AN INNER AND OF AN OUTER PART

The present invention relates to a fixed or rotatable structural member, for example, a gear, consisting of at least one inner and one outer part, whose one part forms a base body consisting preferably of metal and whose other part forms a contact or running surface applied preferably according to conventional die-casting or injection-molding process, whereby the contact surfaces extending in the circumferential direction of both parts are constructed of undulated shape.

A gear is already known from the Austrian Pat. No. 218,313 which is provided with a synthetic plastic coating that constitutes the gear rim and which covers at least one outer end face of the hub. It is disadvantageous in this prior art construction that during the manufacture of such a gear, in addition to the desired shrinkage stresses extending in the radial direction, also axially directed shrinkage stresses occur which lead to a shrinkage superimposition. An additional loading and stressing of the structural member results therefrom so that the operational load capability of the gear is strongly reduced. Also, such a gear is not suited for continuous loading, especially in case of alternating loads since the occurring forces can be introduced only in part into the base body. The danger exists in connection therewith that the portion of the toothed rim extending over the width of the hub may break off and the gear fails completely—inter alia, by reason of the now lacking axial fastening.

It is the aim of the present invention to avoid the described disadvantages in connection with workpieces having preferably a sprayed-on contact or running surface and to provide a connection, by means of which a good form-locking connection is achieved even at high operating temperatures and in which a dynamic loading and stressing does not lead to an uneven stress distribution. Furthermore, the structural parts so constructed should also be relatively inexpensive in manufacture.

As solution to the underlying problem, a fixed or rotatable structural member, for example, a gear, consisting at least of an inner part and of an outer part, is proposed in accordance with the present invention, whose one part forms a base body consisting preferably of metal and whose other part forms a running or contact surface applied preferably according to the diecasting or injection-molding process, whereby the contact surfaces extending in the circumferential direction of both parts are constructed of undulatory shape, whereby according to the present invention the base body within the area of the sprayed-on part, is at least as wide as the latter, and whereby additionally the undulations start at least from the end surfaces of the sprayed-on part.

It is assured by the construction of the present invention, for example, of a gear, that no crack formation can start within the connecting area in the end surfaces of the sprayed-on part, in which stresses occurred heretofore during operation which were difficult to control, since a completely satisfactory transmission of the occurring forces into the base body takes place by the undulations starting from there.

In case the width of the base body is larger within the area of the connection of the two parts than that of the sprayed-on part and the connecting surface is constructed undulatory only over the width of the sprayed-on part, an axial securing can be achieved in a particularly simple manner.

A simple constructive configuration of the undulatory shape and a facilitated manufacture thereof by means of a machine tool is achieved if—as proposed according to the present invention—the undulatory profile of the contact surfaces is created by the series connection of mutually contacting or connecting circles whose points of contact form the points of reversal for the respectively succeeding half-circle.

The circles may thereby also have different diameters.

Furthermore, the diameters of the circles may also have different distances from the assumed center point of the structural part.

A simple axial fixation can be achieved if the undulations extend obliquely to the axial direction of the structural part.

The same advantage is also realized if the contact surface has an approximately centrally located recess or embossment or raised portion in the circumferential direction whereby a change of the stress behavior does not take place.

Accordingly, it is an object of the present invention to provide a structural member, which consists of at least an inner and of an outer part, which avoids by simple means the aforementioned shortcomings and drawbacks encountered in the prior art.

Another object of the present invention consists of a two-partite structural member consisting of at least one inner and one outer part in which a favorable stress distribution is assured under all operating conditions.

A further object of the present invention resides in a structural part consisting of an inner and of an outer portion which exhibits improved continuous loading capabilities, thereby improving its reliability in operation.

Still another object of the present invention resides in a structural member consisting of a metallic inner part and of a synthetic resinous outer part in which a good form-locking connection is achieved even at high operating temperatures while dynamic loads do not cause non-uniform stress distributions.

Another object of the present invention resides in a structural member of the type described above in which the danger of crack formation is substantially reduced and therewith the danger of failure of the part is greatly minimized.

A further object of the present invention resides in a structural part consisting of at least one inner portion and one outer portion, which can be manufactured in a relatively simple manner and assures an axial fastening of the parts by simple means.

These and other objects, features and advantages of the present invention will become more apparent from the following description when taken in connection with the accompanying drawing which shows, for purposes of illustration only, two embodiments in accordance with the present invention, and wherein.

Figure 1:
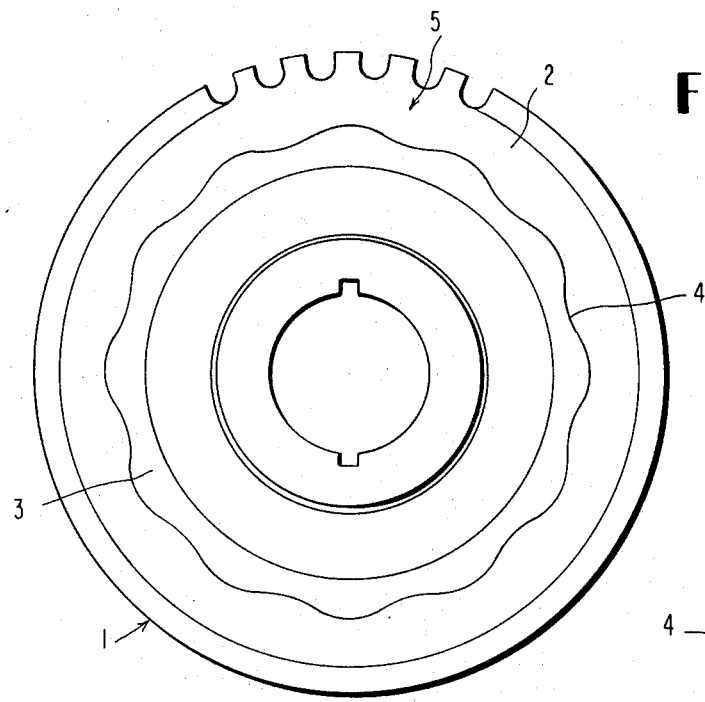
FIG. 1 is an elevational view of a structural part according to the present invention constructed as gear and provided with continuous undulations.

Referring now to the drawing wherein like reference numerals are used throughout the various views to designate like parts, and more particularly to FIG. 1, a structural member generally designated by reference numeral 1 and consisting of at least two parts, which is constructed in FIG. 1 as gear, includes a sprayed-on part 2 which is applied onto a base body 3 having an undulatory contact surface 4, for example, according to the die-casting process or injection-molding process. The undulations thereby start from the end faces 5 of the sprayed-on part 2.

Figure 3:
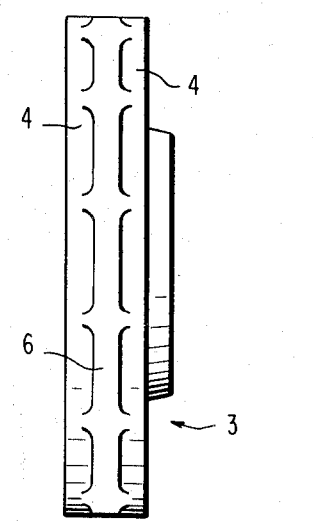
FIG. 3 is a side elevational view of the structural part of FIG. 2, taken in the direction of arrow III of FIG. 2.
Figure 2:
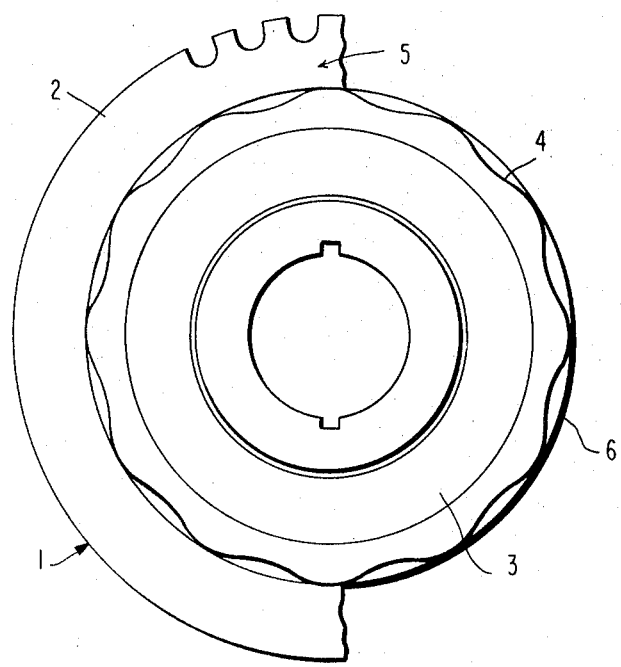
FIG. 2 is an elevational view, partly broken away, of a modified embodiment of a structural part in accordance with the present invention, similar to FIG. 1, which includes raised portions located centrally in the circumferential direction.

Also in FIGS. 2 and 3, the structural member 1 is illustrated as gear for the sake of simplicity. The arrangement and anchoring of the sprayed-on part 2 according to the present invention can be applied, of course, equally readily also to friction disks, cam disks, clutches and internally toothed gears.

The embodiment according to FIGS. 2 and 3 includes—as can be seen in particular from FIG. 3—a circumferentially extending, web-like raised portion 6 which is adjoined by the undulatory contact surfaces 4. The undulatory contact surfaces 4 may also be equipped with undulations of different heights. Similarly, the web-like raised portion 6 may also be replaced by a recess (not illustrated). If the undulations are constituted by circles which adjoin one another, then the points of contact of these circles may form the points of reversal for the respectively following half-circle. The circles may have the same or different diameters, and the diameters may have different distances from the assumed center point of the structural part. Additionally, the undulations may also extend obliquely to the axial direction of the structural part 1 to improve the anchoring and fixing.

Any suitable plastic (synthetic resinous) material of known type may be used for part 2, such as, for example, a suitable polyamide or polypropylene.

While I have shown and described two embodiments in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. A structural member consisting of at least an inner part and of an outer part, whose one part forms a base body and whose other part forms a running surface, the mutual contact surface means of the two parts, which extend in the circumferential direction, being constructed undulatory, characterized in that said one part forming the base body is at least as wide within the area of the other part as the latter, and in that the undulations start at least from the end surfaces of said other part.

2. A structural member according to claim 1, characterized in that the base part consists of metal.

3. A structural member according to claim 2, characterized in that the running surface is applied according to the die-casting process.

4. A structural member according to claim 1, characterized in that said member is a fixed structural member.

5. A structural member according to claim 1, characterized in that said structural member is a rotatable member.

6. A structural member according to claim 1, characterized in that said structural member is a gear.

7. A structural member according to claim 1, characterized in that the undulatory profile of the contact surfaces is created by the series-connection of mutually contacting circles whose points of contact form the points of reversal for the respectively following circle portion.

8. A structural member according to claim 7, characterized in that the circles have different diameters.

9. A structural member according to claim 8, characterized in that the diameters of the circles have different distances from the assumed center point of the structural member.

10. A structural member according to claim 9, characterized in that the undulations extend obliquely to the axial direction of the structural member.

11. A structural member according to claim 10, characterized in that the contact surface means includes in the circumferential direction an approximately centrally located recess.

12. A structural member according to claim 10, characterized in that the contact surface means includes in the circumferential direction an approximately centrally located raised portion.

13. A structural member according to claim 10, characterized in that the contact surface means includes approximately centrally disposed anchoring means in the circumferential direction.

14. A structural member according to claim 13, characterized in that the base part consists of metal.

15. A structural member according to claim 14, characterized in that the running surface is applied according to the die-casting process.

16. A structural member according to claim 14, characterized in that said structural member is a gear.

17. A structural member according to claim 7, characterized in that the diameters of the circles have different distances from the assumed center point of the structural member.

18. A structural member according to claim 1, characterized in that the undulations extend obliquely to the axial direction of the structural member.

19. A structural member according to claim 1, characterized in that the contact surface means includes in the circumferential direction an approximately centrally located recess.

20. A structural member according to claim 1, characterized in that the contact surface means includes in the circumferential direction an approximately centrally located raised portion.

21. A structural member according to claim 1, characterized in that the contact surface means includes approximately centrally disposed anchoring means in the circumferential direction.

22. A structural member according to claim 2, characterized in that the running surface is applied by injection molding.

* * * * *